United States Patent
Ohira et al.

(10) Patent No.: US 10,747,049 B2
(45) Date of Patent: Aug. 18, 2020

(54) DISPLAY DEVICE

(71) Applicant: Japan Display Inc., Tokyo (JP)

(72) Inventors: Hirofumi Ohira, Tokyo (JP); Koji Yoshida, Tokyo (JP)

(73) Assignee: Japan Display Inc., Tokyo (JP)

( * ) Notice: Subject to any disclaimer, the term of this patent is extended or adjusted under 35 U.S.C. 154(b) by 28 days.

(21) Appl. No.: 15/936,905

(22) Filed: Mar. 27, 2018

(65) Prior Publication Data

US 2018/0284538 A1 Oct. 4, 2018

(30) Foreign Application Priority Data

Mar. 29, 2017 (JP) .............................. 2017-066269

(51) Int. Cl.
*G02F 1/1335* (2006.01)
*G02F 1/135* (2006.01)
*G02F 1/1347* (2006.01)

(52) U.S. Cl.
CPC ........ *G02F 1/133536* (2013.01); *G02F 1/135* (2013.01); *G02F 1/13471* (2013.01); *G02F 1/133512* (2013.01); *G02F 1/133514* (2013.01); *G02F 2001/1351* (2013.01); *G02F 2201/121* (2013.01); *G02F 2201/123* (2013.01)

(58) Field of Classification Search
CPC ......... G02F 1/133536; G02F 1/133512; G02F 1/133514
See application file for complete search history.

(56) References Cited

U.S. PATENT DOCUMENTS

| | | | |
|---|---|---|---|
| 2002/0044352 A1* | 4/2002 | Yamamoto | G02B 1/105 359/483.01 |
| 2003/0137732 A1* | 7/2003 | Sugino | B29C 55/04 359/487.01 |
| 2011/0255036 A1* | 10/2011 | Aaltonen | G02F 1/133308 349/96 |

(Continued)

FOREIGN PATENT DOCUMENTS

| | | |
|---|---|---|
| JP | 2004-069926 | 3/2004 |
| JP | 2005-157033 A | 6/2005 |

(Continued)

OTHER PUBLICATIONS

Japanese Office Action dated Apr. 14, 2020 in corresponding Japanese Application No. 2017-066269.

*Primary Examiner* — Lucy P Chien (74) *Attorney, Agent, or Firm* — K&L Gates LLP (57) ABSTRACT

According to an aspect, a display device includes: a coated polarization layer configured to absorb light linearly polarized in a second polarization direction perpendicular to a first polarization direction; an optical sheet configured to reflect light linearly polarized in the first polarization direction and transmit light linearly polarized in the second polarization direction; a front panel disposed between the coated polarization layer and the optical sheet and capable of changing a polarization direction of incident light into another polarization direction in accordance with a voltage applied to the front panel; and a display panel overlapping with the front panel with a polarization plate interposed therebetween, the polarization plate transmitting light linearly polarized in the second polarization direction to the optical sheet.

7 Claims, 5 Drawing Sheets

(56) References Cited

U.S. PATENT DOCUMENTS

| | | | |
|---|---|---|---|
| 2012/0147281 A1* | 6/2012 | Matsuhiro | G02B 27/26 349/15 |
| 2012/0218325 A1* | 8/2012 | Hiroki | G09G 3/003 345/697 |
| 2013/0038811 A1 | 2/2013 | Sugita et al. | |
| 2015/0177563 A1 | 6/2015 | Cho et al. | |
| 2016/0104410 A1* | 4/2016 | Sagardoyburu | G09G 3/2003 345/4 |
| 2016/0209704 A1 | 7/2016 | Sugita et al. | |
| 2016/0306210 A1* | 10/2016 | Oh | G02F 1/13394 |
| 2017/0357112 A1 | 12/2017 | Shibahara et al. | |

FOREIGN PATENT DOCUMENTS

| | | |
|---|---|---|
| JP | 2007-127724 | 5/2007 |
| JP | 2013-41052 | 2/2013 |
| KR | 10-2012-0074499 | 7/2012 |
| WO | 2016/136100 | 9/2016 |

* cited by examiner

DISPLAY DEVICE

CROSS-REFERENCE TO RELATED APPLICATIONS

This application claims priority from Japanese Application No. 2017-066269, filed on Mar. 29, 2017, the contents of which are incorporated by reference herein in its entirety.

BACKGROUND

1. Technical Field

The present disclosure relates to a display device that can display an image in a reflective state in which incident light is reflected, and in a transmissive state in which incident light is transmitted.

2. Description of the Related Art

Japanese Patent Application Laid-open Publication No. 2005-157033 discloses a device that can switch between a display state of displaying an image and a mirror state (reflective state) of obtaining a reflected image.

Typically, anisotropy is provided to a polarization plate by absorbing dichroic iodine that absorbs light differently in different vibratory directions onto a polyvinyl alcohol (PVA) film, and stretching the film in one direction to have molecules uniformly oriented in a certain direction.

The polarization plate thus stretched has an uneven thickness due to the stretching. In a reflective state in which incident light is reflected, light is reflected differently at different positions, which may be viewed as color unevenness.

For the foregoing reasons, there is a need for a display device that can display an image in a reflective state in which incident light is reflected while making unevenness unnoticeable, and in a transmissive state in which incident light is transmitted.

SUMMARY

According to an aspect, a display device includes: a coated polarization layer configured to absorb light linearly polarized in a second polarization direction perpendicular to a first polarization direction; an optical sheet configured to reflect light linearly polarized in the first polarization direction and transmit light linearly polarized in the second polarization direction; a front panel disposed between the coated polarization layer and the optical sheet and capable of changing a polarization direction of incident light into another polarization direction in accordance with a voltage applied to the front panel; and a display panel overlapping with the front panel with a polarization plate interposed therebetween, the polarization plate transmitting light linearly polarized in the second polarization direction to the optical sheet.

According to another aspect, a display device includes: a polarization layer including a liquid crystal material and a dichroic pigment, and configured to absorb light linearly polarized in a second polarization direction perpendicular to a first polarization direction; an optical sheet configured to reflect light linearly polarized in the first polarization direction and transmit light linearly polarized in the second polarization direction; a front panel disposed between the polarization layer and the optical sheet and capable of changing a polarization direction of incident light into another polarization direction in accordance with a voltage applied to the front panel; and a display panel overlapping with the front panel with a polarization plate interposed therebetween, the polarization plate transmitting light linearly polarized in the second polarization direction to the optical sheet.

DETAILED DESCRIPTION

Modes (embodiments) for carrying out the present disclosure will be described below in detail with reference to the drawings. The contents described in the embodiments are not intended to limit the present disclosure. Components described below include components easily conceivable by those skilled in the art and components substantially identical therewith. Furthermore, the components described below can be appropriately combined. The disclosure is given by way of example only, and various changes made without departing from the spirit of the disclosure and easily conceivable by those skilled in the art naturally fall within the scope of the present disclosure. The drawings may possibly illustrate the width, the thickness, the shape, and other elements of each unit more schematically than the actual aspect to simplify the explanation. These elements, however, are given by way of example only and are not intended to limit interpretation of the present disclosure. In the specification and the drawings, components similar to those previously described with reference to a preceding drawing are denoted by like reference numerals, and overlapping explanation thereof will be appropriately omitted. In this disclosure, when an element A is described as being "on" another element B, the element A can be directly on the other element B, or there can be one or more elements between the element A and the other element B.

First Embodiment

Figure 1:
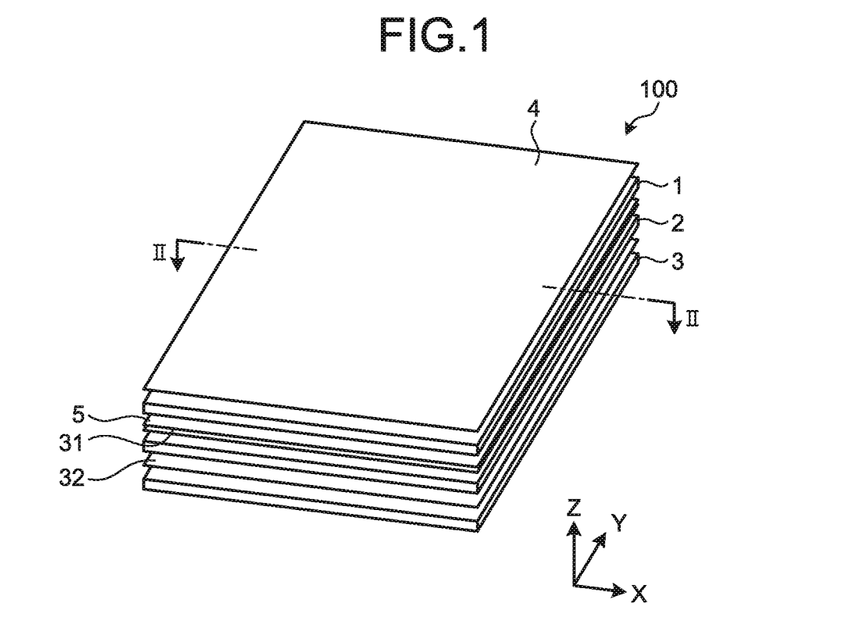
FIG. 1 is a perspective view illustrating a configuration example of a display device in a first embodiment.

FIG. 1 is a perspective view illustrating a configuration example of a display device in a first embodiment. A display device 100 includes a coated polarization layer 4, a front panel 1, an optical sheet 5, an upper polarization plate 31, a display panel 2, a lower polarization plate 32, and a backlight 3. In FIG. 1, one direction extending along a plane of the display panel 2 is referred to as an X direction; a direction perpendicular to the X direction in the plane of the display panel 2 is referred to as a Y direction; and a direction perpendicular to the X-Y plane is referred to as a Z direction. When viewed in the Z direction, a display surface side (or upper face side) refers to a side which a display surface (or upper face) to display an image faces; and a back surface side (or lower face side) refers to a side which a back surface (or lower face) opposite to the display surface faces.

When viewed in the Z direction, the lower polarization plate 32 and the backlight 3 overlap with each other on the back surface side of the display panel 2.

The backlight 3 is a lighting device that emits light toward the display panel 2. For example, the backlight 3 includes a light source and a light guide plate, and scatters light emitted from the light source by the light guide plate to emit the scattered light from its emitting surface facing the display panel 2.

In the Z direction, the upper polarization plate 31, the optical sheet 5, the front panel 1, and the coated polarization layer 4 are sequentially stacked on the display panel 2 on the display side.

Figure 2:
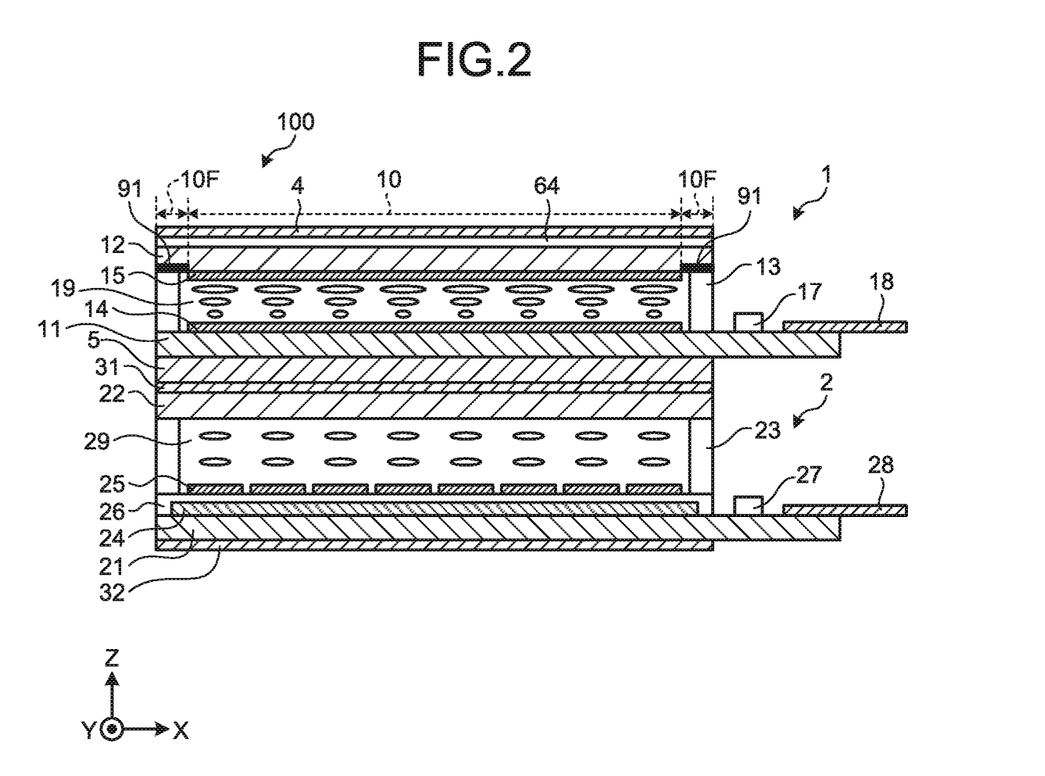
FIG. 2 is a sectional view of the display device in the first embodiment.
Figure 3:
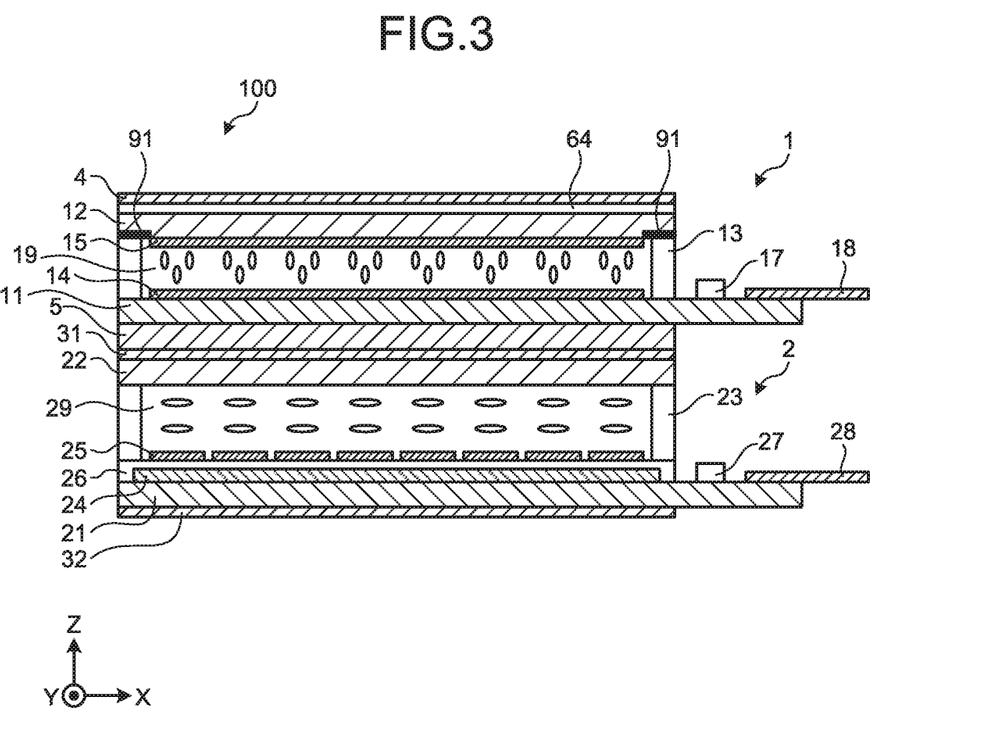
FIG. 3 is another sectional view of the display device in the first embodiment.

FIG. 2 is a sectional view of the display device in the first embodiment. Specifically, FIG. 2 illustrates the display device 100 in a display state of displaying an image. FIG. 3 is a sectional view of the display device in the first embodiment. Specifically FIG. 3 illustrates the display device 100 in a reflective state of reflecting incident light. FIG. 2 and FIG. 3 each illustrate a schematic section taken along the II-II line illustrated in FIG. 1.

As illustrated in FIG. 2 and FIG. 3, the display panel 2 is a liquid crystal display device. The display panel 2 includes a translucent substrate 21, another translucent substrate 22, and a liquid crystal layer 29 interposed between the substrate 21 and the substrate 22 and sealed with a sealing layer 23.

The liquid crystal layer 29 modulates light passing therethrough, in accordance with the state of an electric field. In this embodiment, the liquid crystal layer 29 employs a transverse electric-field mode such as a fringe field switching (FFS) mode or an in-plane switching (IPS) mode. However, the present disclosure is not limited thereto, and the liquid crystal layer 29 may employ a vertical electric-field mode. The liquid crystal layer 29 may use liquid crystal of various modes, such as a twisted nematic (TN) mode, a vertical alignment (VA) mode, and an electrically controlled birefringence (ECB) mode.

Figure 4:
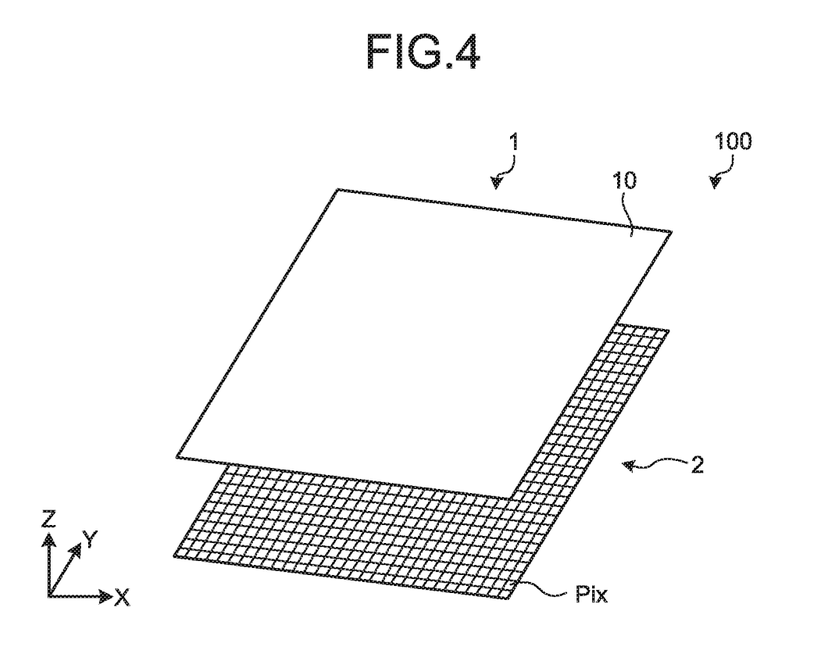
FIG. 4 is a diagram for schematically comparing and explaining the sizes of pixels in a display panel and the size of a drive electrode.

FIG. 4 is a diagram for schematically comparing and explaining the sizes of pixels in the display panel and the size of a drive electrode. The display panel 2 displays an image. The display panel 2 includes a large number of pixels Pix two-dimensionally arranged therein, as illustrated in FIG. 4. Light emitted from the backlight 3 (see FIG. 1) enters the display panel 2. The display panel 2 displays an image by changing the transmittance of light that enters the respective pixels Pix.

The display device 100 in the first embodiment can be employed as a display device supporting monochrome display and as a display device supporting color display. When the display device 100 supports color display, one pixel Pix (unit pixel), which is a unit for forming a color image, includes a plurality of sub-pixels. More specifically, in a display device supporting color display, one pixel includes three sub-pixels, i.e., a sub-pixel for displaying red (R), a sub-pixel for displaying green (G), and a sub-pixel for displaying blue (B), for example.

The configuration of each pixel is not limited to a combination of sub-pixels for the three primary colors of R, G, and B. Each pixel can be configured to include another sub-pixel for another color or a plurality of sub-pixels for other colors in addition to the sub-pixels for the three primary colors, R, G, and B. More specifically, each pixel may include another sub-pixel for displaying white (W) to increase luminance, or may include at least one sub-pixel for displaying a complementary color to expand a color reproduction range, for example.

A plurality of pixel electrodes 25 arranged in a matrix and a common electrode 24 are disposed between one side of the substrate 21 illustrated in FIG. 2 and FIG. 3 and the liquid crystal layer 29. Each of the pixel electrodes 25 and the common electrode 24 are insulated from each other by an insulating layer 26, and face each other in the z direction perpendicular to the surfaces of the substrate 21. The pixel electrodes 25 and the common electrode 24 are translucent electrodes made of a translucent conductive material (translucent conductive oxide) such as indium tin oxide (ITO). The substrate 21 is a translucent substrate made of glass, for example. An orientation film (not illustrated) is stacked on one side of the substrate 21 facing the liquid crystal layer 29. The lower polarization plate 32 is disposed on the other side of the substrate 21 facing away from the liquid crystal layer 29.

A color filter (not illustrated) is disposed on the one side of the substrate 22 facing the liquid crystal layer 29. An orientation film (not illustrated) is formed on one side of the color filter facing the liquid crystal layer. The color filter includes color regions colored with respective three colors, i.e., red (R), green (G), and blue (B). The upper polarization plate 31 is disposed on the other side of the substrate 22 facing away from the liquid crystal layer 29.

The display panel 2 includes a drive circuit 27 called a driver integrated circuit (IC). A flexible printed circuit (FPC) board 28 supplies signals to the drive circuit 27 and power for driving the drive circuit 27.

As illustrated in FIG. 2 and FIG. 3, the front panel 1 includes a first substrate 11, a second substrate 12, and a liquid crystal layer 19 interposed between the first substrate 11 and the second substrate 12, and sealed with a sealing layer 13. The first substrate 11 and the second substrate 12 are translucent substrates made of glass, for example.

The liquid crystal layer 19 modulates light in accordance with the state of an electric field to change the polarization direction of the light incident thereon and passing therethrough to another polarization direction. The liquid crystal layer 19 employs, for example, the TN mode in the present embodiment.

A drive electrode 14 having a size larger than or equal to that of the entire region covering all the pixels Pix arranged in a matrix illustrated in FIG. 4 is disposed on one side of the first substrate 11 facing the liquid crystal layer 19 illustrated in FIG. 2 and FIG. 3. A fixed-potential electrode 15 having a size larger than that of the entire region covering all the pixels Pix arranged in a matrix illustrated in FIG. 4 is disposed on one side of the second substrate 12 facing the liquid crystal layer 19. In the first substrate 11, an orientation film (not illustrated) sets the orientation of liquid crystal in the liquid crystal layer 19, the liquid crystal in contact with the orientation film, to a constant direction. Similarly, in the second substrate 12, another orientation film (not illustrated) sets the orientation of liquid crystal in the liquid crystal layer 19, the liquid crystal in contact with the orientation film, to a direction different from the orientation direction of the liquid crystal in contact with the orientation film of the first substrate 11. The drive electrode 14 and the fixed-potential electrode 15 face each other in the z direction perpendicular to the surfaces of the first substrate 11. The drive electrode 14 and the fixed-potential electrode 15 are translucent electrodes made of a translucent conductive material (translucent conductive oxide) such as ITO.

As illustrated in FIG. 2 and FIG. 3, the front panel 1 includes: a transmissive region 10 through which incident light or light from the display panel 2 is transmitted; and a frame region 10F having lower transmittance than that in the transmissive region 10, because of a light blocking layer 91 that blocks light around the periphery of the transmissive region 10. As illustrated in FIG. 4, the area of the transmissive region 10 is equal to the area of the display region in which all the pixels Pix are arranged.

The front panel 1 includes a drive circuit 17 called a driver IC. A flexible printed circuit (FPC) board 18 provides signals to the drive circuit 17 and power for driving the drive circuit 17. A base material layer 64 made of cycloolefin polymer is disposed on the other side of the second substrate 12 facing away from the liquid crystal layer 19. The display surface side of the base material layer 64 is subjected to a rubbing process to have a particular orientation.

The coated polarization layer 4 is formed on the display surface side of the base material layer 64. In other words, the coated polarization layer 4 is disposed on the other side of the second substrate 12 facing away from the liquid crystal layer 19. The coated polarization layer 4 is a polarization layer obtained by mixing a liquid crystal material with a dichroic pigment. The liquid crystal material orients itself in accordance with the particular orientation provided to the base material layer 64, thereby orienting the dichroic pigment in one direction. As a result, the coated polarization layer 4 absorbs light linearly polarized in a second polarization direction perpendicular to a first polarization direction.

The optical sheet 5 reflects light linearly polarized in the first polarization direction, and transmits linearly polarized light in the second polarization direction. The optical sheet 5 is also called a reflective polarization plate.

Figure 5:
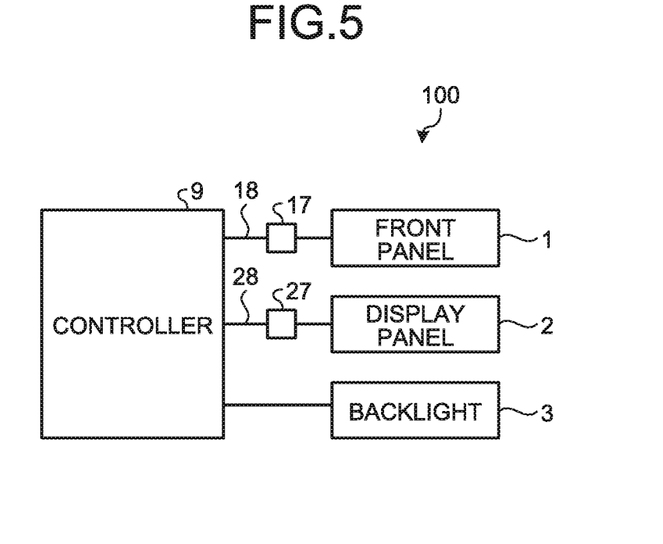
FIG. 5 is a block diagram for explaining the display device in the first embodiment.

FIG. 5 is a block diagram for explaining the display device in the first embodiment. For example, a controller 9 is a computer including a central processing unit (CPU), which is an arithmetic device, and a memory, which is a storage device. The controller 9 can implement various functions by executing a computer program using these hardware resources. Specifically, the controller 9 reads out a computer program stored in a certain storage unit (not illustrated) to expand data of the computer program in the memory, and causes the CPU to execute commands contained in the computer program expanded in the memory.

The controller 9 then controls turning on and off the light quantity and the light intensity of the backlight 3, according to the result of a command executed by the CPU. According to the result of a command executed by the CPU, the controller 9 transmits image signals for display in the display panel 2 to the drive circuit 27 via the FPC board 28, causing the drive circuit 27 to display an image on the display panel 2. According to the result of a command executed by the CPU, the controller 9 transmits a command signal for the display state to the drive circuit 17 via the FPC board 18, causing the drive circuit 17 to bring the drive electrode 14 into a state in which no voltage is applied to a drive electrode 14. Further, according to the result of a command executed by the CPU, the controller 9 transmits a command signal for the reflective state to the drive circuit 17 via the FPC board 18, causing the drive circuit 17 to bring the drive electrode 14 into a state in which a voltage is applied to the drive electrode 14.

Figure 6:
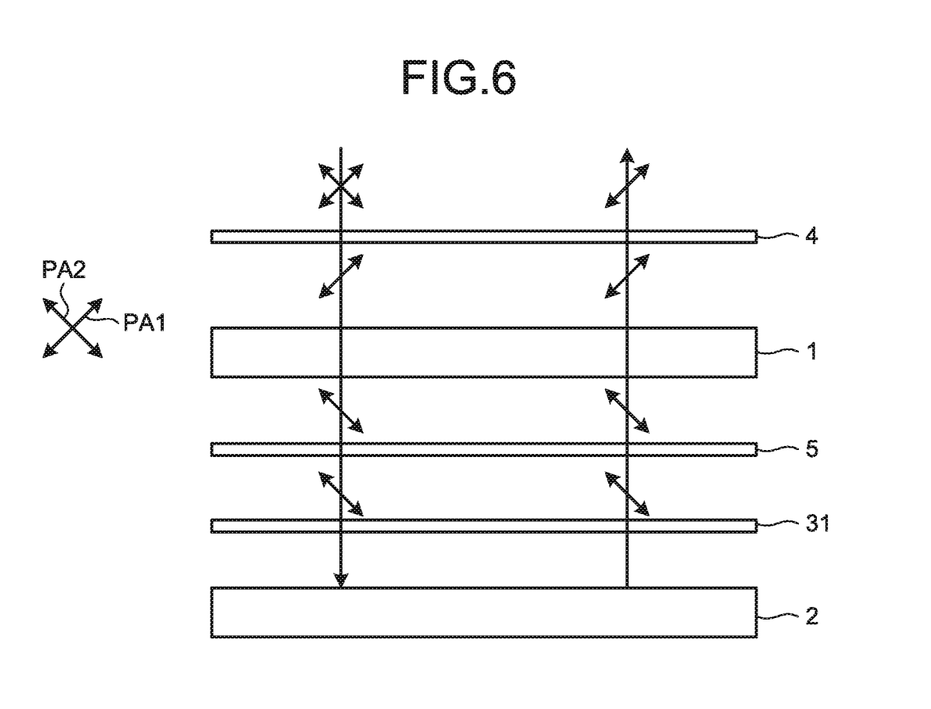
FIG. 6 is a schematic view for explaining a display state in which an image can be displayed, simultaneously in a transmissive state in which incident light is transmitted.

FIG. 6 is a schematic view for explaining the display state in which an image can be displayed, simultaneously in the transmissive state in which incident light is transmitted. As illustrated in FIG. 6, the coated polarization layer 4 absorbs light linearly polarized in a second polarization direction PA2 perpendicular to a first polarization direction PA1.

Light linearly polarized in the first polarization direction PA1 is transmitted through the coated polarization layer 4 and enters the front panel 1. In the front panel 1, no voltage is applied to the drive electrode 14 by the drive circuit 17, as illustrated in FIG. 2. Consequently, the front panel 1 converts the light linearly polarized in the first polarization direction PA1 and incident thereon from the coated polarization layer 4 into light linearly polarized in the second polarization direction PA2, and emits the light toward the optical sheet 5.

In this state, when the display panel 2 displays an image, the coated polarization layer 4, the front panel 1, and the optical sheet 5 are not shuttered against the light linearly polarized in the second polarization direction PA2, thereby making the image easily viewed.

The optical sheet 5 transmits light linearly polarized in the second polarization direction PA2 and incident thereon from the front panel 1. The upper polarization plate 31 transmits light linearly polarized in the second polarization direction PA2. In this manner, an image on the display panel 2 can be viewed from the display surface side of the coated polarization layer 4.

The display panel 2 outputs an image through the upper polarization plate 31 using light linearly polarized in the second polarization direction PA2.

The optical sheet 5 transmits the light linearly polarized in the second polarization direction PA2 and incident thereon from the display panel 2.

The front panel 1 converts the light linearly polarized in the second polarization direction PA2 and incident thereon from the optical sheet 5 into light linearly polarized in the first polarization direction PA1, and emits the light toward the coated polarization layer 4.

The light linearly polarized in the first polarization direction PA1 is transmitted through the coated polarization layer 4 and is emitted as an image on the display surface side of the coated polarization layer 4.

Figure 7:
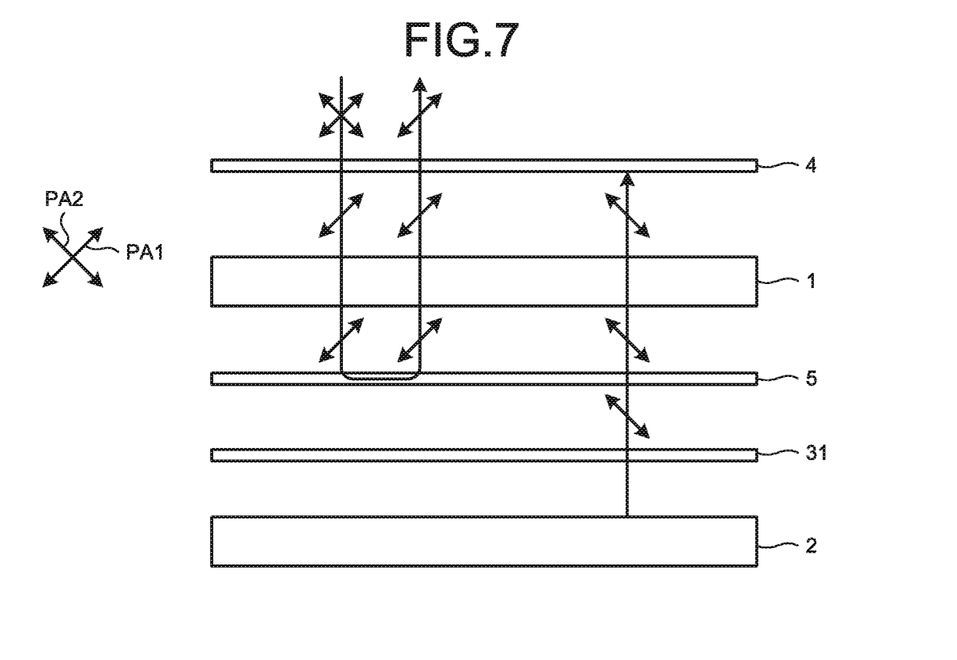
FIG. 7 is a schematic view for explaining a reflective state in which incident light is reflected.

FIG. 7 is a schematic view for explaining the reflective state in which incident light is reflected. As illustrated in FIG. 7, the coated polarization layer 4 absorbs light linearly polarized in the second polarization direction PA2 perpendicular to the first polarization direction PA1.

Light linearly polarized in the first polarization direction PA1 is transmitted through the coated polarization layer 4 and enters the front panel 1. In the front panel 1, a voltage is applied to the drive electrode 14 by the drive circuit 17, as illustrated in FIG. 3. The front panel 1 emits the light linearly polarized in the first polarization direction PA1 and incident thereon from the coated polarization layer 4 toward the optical sheet 5 without converting the light.

The light linearly polarized in the first polarization direction PA1 and incident thereon from the front panel 1 is reflected by the optical sheet 5.

After being reflected by the optical sheet 5, the light linearly polarized in the first polarization direction PA1 enters the front panel 1. The front panel 1 emits the light linearly polarized in the first polarization direction PA1 and incident thereon from the optical sheet 5 toward the coated polarization layer 4 without converting the light.

The light linearly polarized in the first polarization direction PA1 and emitted from the front panel 1 is transmitted through the coated polarization layer 4, so that an image is displayed like a mirror image on the display surface side of the coated polarization layer 4, when viewed from the display surface side of the coated polarization layer 4.

In this state, even when the display panel 2 displays an image, the coated polarization layer 4, the front panel 1, and the optical sheet 5 are shuttered against light linearly polarized in the second polarization direction PA2, thereby making the image less likely to be viewed.

The display panel 2 outputs an image through the upper polarization plate 31 using light linearly polarized in the second polarization direction PA2.

The optical sheet 5 transmits the light linearly polarized in the second polarization direction PA2 and incident thereon from the display panel 2.

The front panel 1 emits the light linearly polarized in the second polarization direction PA2 and incident thereon from the optical sheet 5 toward the coated polarization layer 4 without converting the light.

The light linearly polarized in the second polarization direction PA2 is absorbed by the coated polarization layer 4, so that the image is less likely to be viewed from the display surface side of the coated polarization layer 4.

As described above, the display device 100 includes the coated polarization layer 4, the optical sheet 5, the front panel 1, the upper polarization plate 31, and the display panel 2. The coated polarization layer 4 absorbs light linearly polarized in the second polarization direction PA2 perpendicular to the first polarization direction PA1. The optical sheet 5 reflects light linearly polarized in the first polarization direction PA1 and transmits light linearly polarized in the second polarization direction PA2. The front panel 1 can change the polarization direction of light incident thereon into another polarization direction according to the state of an electric field. The front panel 1 is disposed between the coated polarization layer 4 and the optical sheet 5. In the Z direction, the display panel 2 overlaps the front panel 1 with the upper polarization plate 31 interposed therebetween, the upper polarization plate 31 transmitting light linearly polarized in the second polarization direction PA2 through the optical sheet 5. As a result, the display device 100 can switch between the display state of displaying an image as illustrated in FIG. 2 and FIG. 6, and a mirror state (the reflective state) of obtaining a reflected image as illustrated in FIG. 3 and FIG. 7.

The front panel 1 is closer to an observer than the display panel 2 is. The front panel 1 can switch between a first front panel state and a second front panel state in accordance with the state of a voltage applied to the drive electrode 14 by the drive circuit 17. The first front panel state is a state in which incident light linearly polarized in the first polarization direction PA1 is converted into light linearly polarized in the second direction PA2 to be emitted. The second front panel state is a state in which incident light linearly polarized in the first polarization direction PA1 is emitted without being converted.

The coated polarization layer 4 does not contain iodine. Iodine has the characteristics of absorbing visible light that has relatively short wavelengths. When another polarization plate formed by absorbing typical iodine on a PVA film and stretching the film in one direction to make the orientation of molecules in a constant direction is used in substitution for the coated polarization layer 4 to obtain the mirror state (reflective state) illustrated in FIG. 7, color shift may occur in the reflected image because iodine absorbs light having short wavelengths in the reflected image, and whiteness is shifted to greenish. On the other hand, the coated polarization layer 4 of the display device 100 in the first embodiment is less likely to absorb light having short wavelengths for the reflected image 4 than the polarization plate including iodine, exhibiting more neutral whiteness.

When another polarization plate formed by absorbing typical iodine on a PVA film and stretching the film in one direction to make the orientation of molecules in a constant direction is used in substitution for the coated polarization layer 4 to obtain the mirror state (reflective state) illustrated in FIG. 7, the stretching of the polarization plate makes the surface thereof less smooth, which may cause unevenness in the reflected image. In contrast, the display device 100 in the first embodiment includes the coated polarization layer 4 that has not been stretched. As a result, the coated polarization layer 4 has a smooth surface, preventing unevenness in the reflected image.

Figure 8:
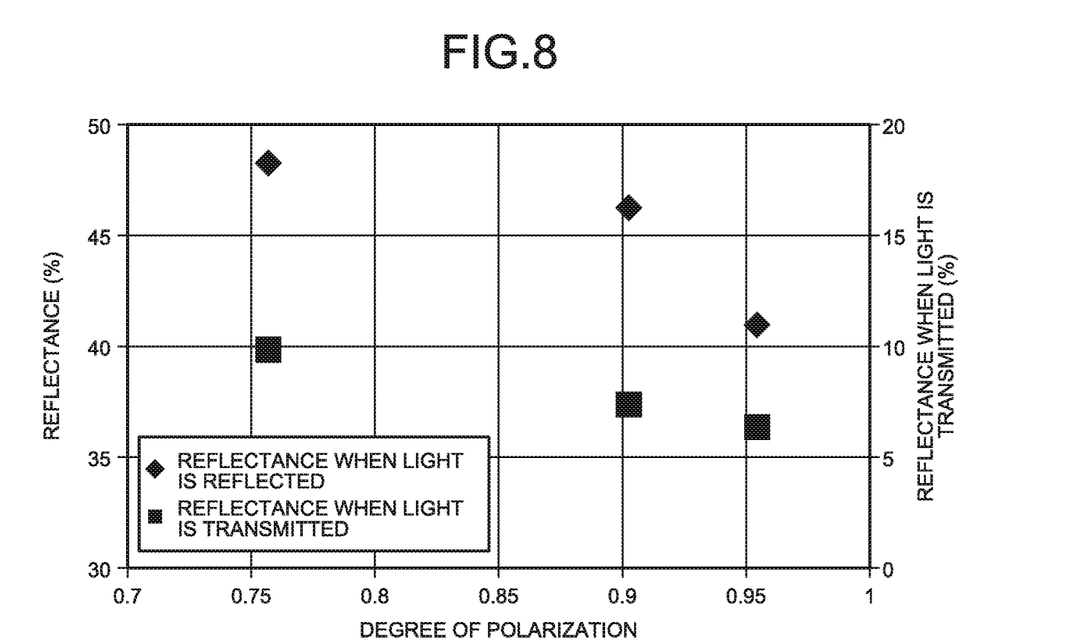
FIG. 8 is a diagram for explaining the relation between a degree of polarization and reflectance in a coated polarization layer.

FIG. 8 is a diagram for explaining the relation between a degree of polarization and reflectance in the coated polarization layer. In FIG. 8, the horizontal axis indicates a degree of polarization; the first vertical axis indicates reflectance when light is reflected as illustrated in FIG. 7; and the second vertical axis indicates reflectance when light is transmitted as illustrated in FIG. 6.

Typically, when light is reflected as illustrated in FIG. 7, the reflectance is preferably high. As a mirror to be used for an automobile, the reflectance is ideally more than 40%. Based on the simulation data illustrated in FIG. 8, the degree of polarization needs to be lower than 0.966 to make the reflectance well over 40%.

When light is transmitted as illustrated in FIG. 6, the reflectance is preferably low. When transmittance is one tenth of the transmittance of the display device 100, a rough indication for reflectance is 8%. Thus, the reflectance is preferably lower than or equal to 8%. According to the simulation data illustrated in FIG. 8, lowering the degree of polarization increases the reflectance when light is transmitted as illustrated in FIG. 6. Consequently, the degree of polarization is preferably higher than or equal to 0.8 to make the reflectance lower than or equal to 8%.

As described above, when the degree of polarization of the coated polarization layer is higher than or equal to 0.8 and lower than 0.966, the reflectance when light is reflected as illustrated in FIG. 7 becomes high, and the reflectance when light is transmitted as illustrated in FIG. 6 becomes low.

Second Embodiment

Figure 9:
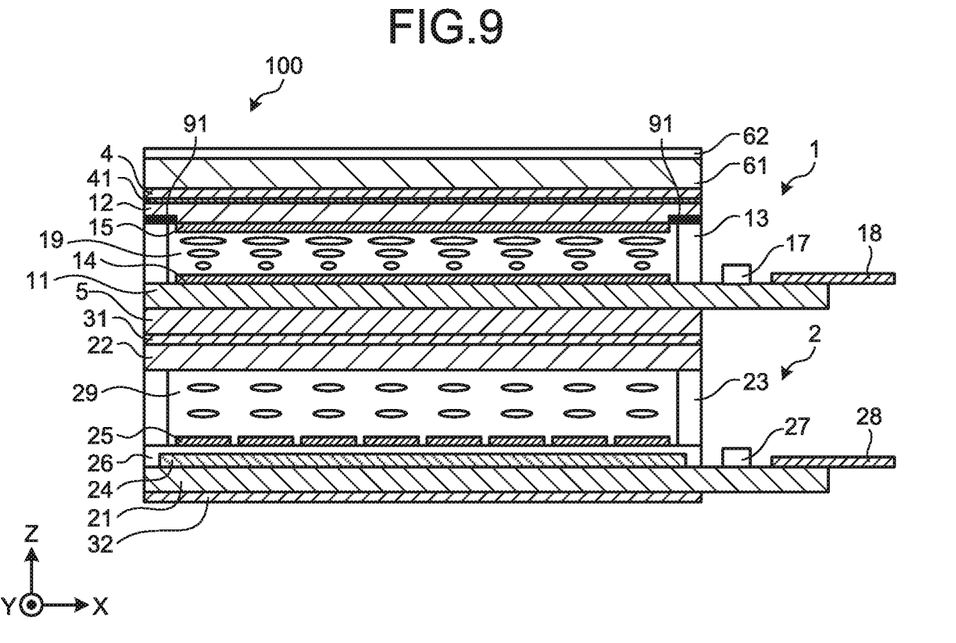
FIG. 9 is a sectional view of the display device in a second embodiment.

FIG. 9 is a sectional view of a display device in a second embodiment. Specifically, FIG. 9 is a view illustrating the display device 100 in the display state of displaying an image. FIG. 9 illustrates a schematic section taken along the II-II line illustrated in FIG. 1. The constituent elements already described in the first embodiment are denoted by the same reference signs, and descriptions thereof are omitted. The coated polarization layer 4 has a soft surface, which is preferably protected for improved durability. It is difficult to laminate an anti-reflective layer directly on the coated polarization layer 4.

As illustrated in FIG. 9, a cover substrate 61 is disposed on the display surface side of the second substrate 12. The cover substrate 61 is a translucent resin substrate, such as a cellulose triacetate film. One side (the back surface side) of the cover substrate 61 facing the front panel 1 is subjected to a rubbing process to have a particular orientation.

The coated polarization layer 4 is formed on the back surface side of the cover substrate 61. The liquid crystal material is self-oriented in accordance with the particular orientation provided to the cover substrate 61. Consequently, the dichroic pigment is also orientated in one direction, so that the coated polarization layer 4 absorbs light linearly polarized in the second polarization direction PA2 perpendicular to the first polarization direction.

An anti-reflective layer 62 is disposed on the display surface side of the cover substrate 61. The anti-reflective layer 62 and the coated polarization layer 4 are disposed on different surfaces of the cover substrate 61, which causes no problem in forming the anti-reflective layer 62.

The display surface side of the second substrate 12 is bonded to the coated polarization layer 4 by a translucent optical resin layer 41.

In the display device 100 according to the second embodiment, the coated polarization layer 4 is disposed on the cover substrate 61 overlapping with the front panel 1, and the coated polarization layer 4 is interposed between the second substrate 12 and the cover substrate 61. With this configuration, the coated polarization layer 4 is protected by the cover substrate 61. Consequently, the display device 100 in the second embodiment improves durability.

Third Embodiment

Figure 10:
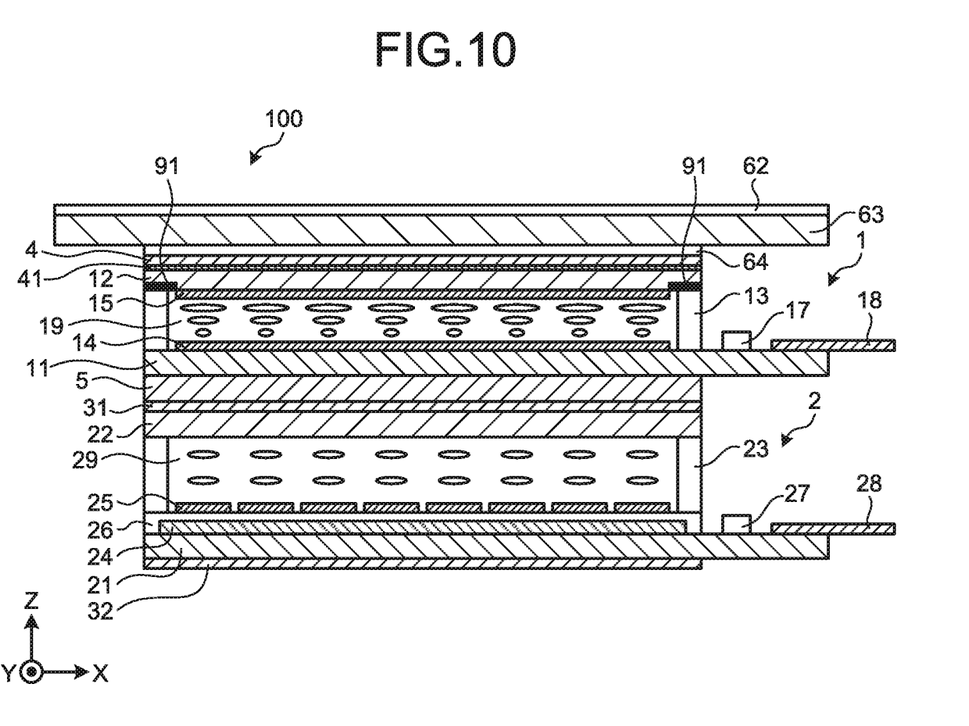
FIG. 10 is a sectional view of the display device in a third embodiment.

FIG. 10 is a sectional view of a display device in a third embodiment. Specifically, FIG. is a view illustrating the display device 100 in the display state of displaying an image. The section in FIG. 10 is a schematic section taken along the II-II line illustrated in FIG. 1. The constituent elements already described in the first and the second embodiments are denoted by the same reference signs, and descriptions thereof are omitted. The coated polarization layer 4 has a soft surface, which is preferably protected to improve durability. An anti-reflective layer is difficult to be directly stacked on the coated polarization layer 4.

As illustrated in FIG. 10, a cover substrate 63 is disposed on the display surface side of the second substrate 12. The cover substrate 63 is a translucent glass substrate. The base material layer 64 made of cycloolefin polymer is disposed on one side (the back surface side) of the cover substrate 63 facing the front panel 1. The display surface side of the base material layer 64 is subjected to a rubbing process to have a particular orientation.

The coated polarization layer 4 is formed on the display surface side of the base material layer 64. The coated polarization layer 4 is a layer made of a mixture of materials that is obtained by mixing a liquid crystal material with a dichroic pigment. The liquid crystal material is self-oriented in accordance with the particular orientation provided to the base material layer 64. Consequently, the dichroic pigment is also oriented in one direction, so that the coated polarization layer 4 absorbs light linearly polarized in the second polarization direction PA2 perpendicular to the first polarization direction.

The anti-reflective layer 62 is disposed on the display surface side of the cover substrate 63 (a surface of the cover substrate 63 facing away from the coated polarization layer 4). The anti-reflective layer 62 and the coated polarization layer 4 are disposed on different surfaces of the cover substrate 63, which causes no problem in forming the anti-reflective layer 62.

The display surface side of the second substrate 12 is bonded to the coated polarization layer 4 by a translucent optical resin layer 41.

In the display device 100 according to the third embodiment, the coated polarization layer 4 is disposed on the cover substrate 63 overlapping with the front panel 1, and is interposed between the second substrate 12 and the cover substrate 63. With this configuration, the coated polarization layer 4 is protected by the cover substrate 63. Consequently, the display device 100 in the third embodiment improves durability.

In the display device 100 according to the third embodiment, the base material layer 64 made of cycloolefin polymer is disposed between the cover substrate 63 and the coated polarization layer 4. This configuration can improve absorbing power of the coated polarization layer 4 to absorb light linearly polarized in the second polarization direction PA2.

While the exemplary embodiments according to the present disclosure have been described, the embodiments are not intended to limit the present disclosure. The contents disclosed in the embodiments are given by way of example only, and various changes may be made without departing from the spirit of the present disclosure. Appropriate changes made without departing from the spirit of the present disclosure naturally fall within the technical scope of the present disclosure. For example, a translucent optical resin or any one of various films, which never obstruct the actions brought about by the embodiments, may be interposed among the coated polarization layer 4, the optical sheet 5, the front panel 1, the upper polarization plate 31, and the display panel 2 according to the above-described embodiments.

The present disclosure can naturally provide other advantageous effects that are provided by the aspects described in the embodiments above and are clearly defined by the description in the present specification or appropriately conceivable by those skilled in the art.

What is claimed is:

1. A display device comprising:
   a coated polarization layer including a liquid crystal material and a dichroic pigment, and configured to absorb light linearly polarized in a second polarization direction perpendicular to a first polarization direction;
   an optical sheet configured to reflect light linearly polarized in the first polarization direction and transmit light linearly polarized in the second polarization direction;
   a front panel disposed between the coated polarization layer and the optical sheet and capable of changing a polarization direction of incident light into another polarization direction in accordance with a voltage applied to the front panel; and
   a display panel overlapping with the front panel in a plan view;
   a polarization plate disposed between the optical sheet and the display panel and configured to transmit light linearly polarized in the second polarization direction to the optical sheet; and
   a base material layer disposed between the coated polarization layer and the front panel and subjected to a process to have an orientation, wherein
   the liquid crystal material is oriented in accordance with the orientation of the base material layer, and the dichroic pigment is oriented in accordance with the orientation of the liquid crystal material,
   the coated polarization layer contains no iodine,
   the coated polarization layer has a degree of polarization higher than or equal to 0.8 and lower than 0.966,
   when the display device is in a reflective state, reflectance is more than 40%, and when the display device is in a transmissive state, reflectance is lower than or equal to 8%.

2. The display device according to claim 1, wherein the front panel includes a first substrate, a second substrate, and a liquid crystal layer interposed between the first substrate and the second substrate.

3. The display device according to claim 2, wherein the coated polarization layer faces one surface of the second substrate, the one surface facing away from the liquid crystal layer of the second substrate.

4. The display device according to claim 2, wherein the coated polarization layer is disposed on a third substrate overlapping with the front panel, and is interposed between the second substrate and the third substrate.

5. The display device according to claim 1, wherein the base material layer is made of cycloolefin polymer.

6. The display device according to claim 4, wherein an anti-reflective layer is disposed on one surface of the third substrate, the one surface facing away from the coated polarization layer.

7. The display device according to claim 5, wherein an anti-reflective layer is disposed on one surface of the third substrate, the one surface facing away from the coated polarization layer.

* * * * *